(12) United States Patent
Takagi et al.

(10) Patent No.: US 6,908,111 B2
(45) Date of Patent: Jun. 21, 2005

(54) ALUMINUM HOLLOW BENT MEMBER AND VEHICULAR MEMBER CONSTRUCTION

(75) Inventors: Masaomi Takagi, Yokohama (JP); Hideyori Sakuragi, Kanagawa (JP); Takahiro Watanabe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/826,804

(22) Filed: Apr. 6, 2001

(65) Prior Publication Data

US 2001/0040387 A1 Nov. 15, 2001

(30) Foreign Application Priority Data

Apr. 13, 2000 (JP) .................................. 2000-112573
Feb. 2, 2001 (JP) .................................. 2001-026833

(51) Int. Cl.⁷ ............................................. B62D 21/02
(52) U.S. Cl. .................... 280/781; 180/311; 280/796; 280/798
(58) Field of Search ........................ 280/781, 796, 280/798, 788; 180/311

(56) References Cited

U.S. PATENT DOCUMENTS 5,862,877 A    1/1999   Horton et al.

FOREIGN PATENT DOCUMENTS

| JP | 61-291272 | * | 12/1986 | ............ 280/781 |
| JP | 4-55172 | * | 2/1992 | ............ 280/781 |
| JP | 5-65076 | * | 3/1993 | ............ 280/781 |
| JP | 6-99870 | * | 4/1994 | ............ 180/311 |
| JP | 6-29049 |   | 8/1994 |   |
| JP | 8-168814 A |   | 7/1996 |   |
| JP | 9-309479 A |   | 12/1997 |   |
| JP | 10-510777 A |   | 10/1998 |   |
| JP | 11-192964 A |   | 7/1999 |   |
| JP | 11-222152 A |   | 8/1999 |   |
| JP | 11-293375 |   | 10/1999 |   |
| JP | 11-333527 A |   | 12/1999 |   |
| JP | 2000-246361 |   | 9/2000 |   |

* cited by examiner

*Primary Examiner*—Eric Culbreth
(74) *Attorney, Agent, or Firm*—Foley & Lardner LLP (57) ABSTRACT

A metallic product has a metallic curved hollow member having a hollow cross section which has a thin wall portion and a thick wall portion which is thicker than the thin wall portion. The metallic curved hollow member is produced by bending a metallic straight hollow member produced by extrusion of aluminum material which is one of aluminum and aluminum alloy. Another metallic product has a metallic curved hollow member having a hollow cross section which has a cross-shaped portion. The metallic curved hollow member is produced by bending a metallic straight hollow member produced by extrusion of aluminum material which is one of aluminum and aluminum alloy.

10 Claims, 9 Drawing Sheets

RELATED ART

FIG.18

RELATED ART

ALUMINUM HOLLOW BENT MEMBER AND VEHICULAR MEMBER CONSTRUCTION

BACKGROUND OF THE INVENTION

The present invention relates to an aluminum hollow bent member which is formed by cutting an aluminum straight hollow member into a predetermined length, followed by bending the same. The present invention further relates to a vehicular member construction using the thus obtained aluminum hollow bent member.

Japanese Utility Model Second Publication No. 6(1994)-029049 describes a vehicular member construction using a pair of tubular members which extend substantially in a fore-and-aft direction of a vehicle.

Moreover, Japanese Patent Unexamined Publication No. 11(1999)-293375 describes a vehicular member made of aluminum effective for reducing weight.

Figure 18:
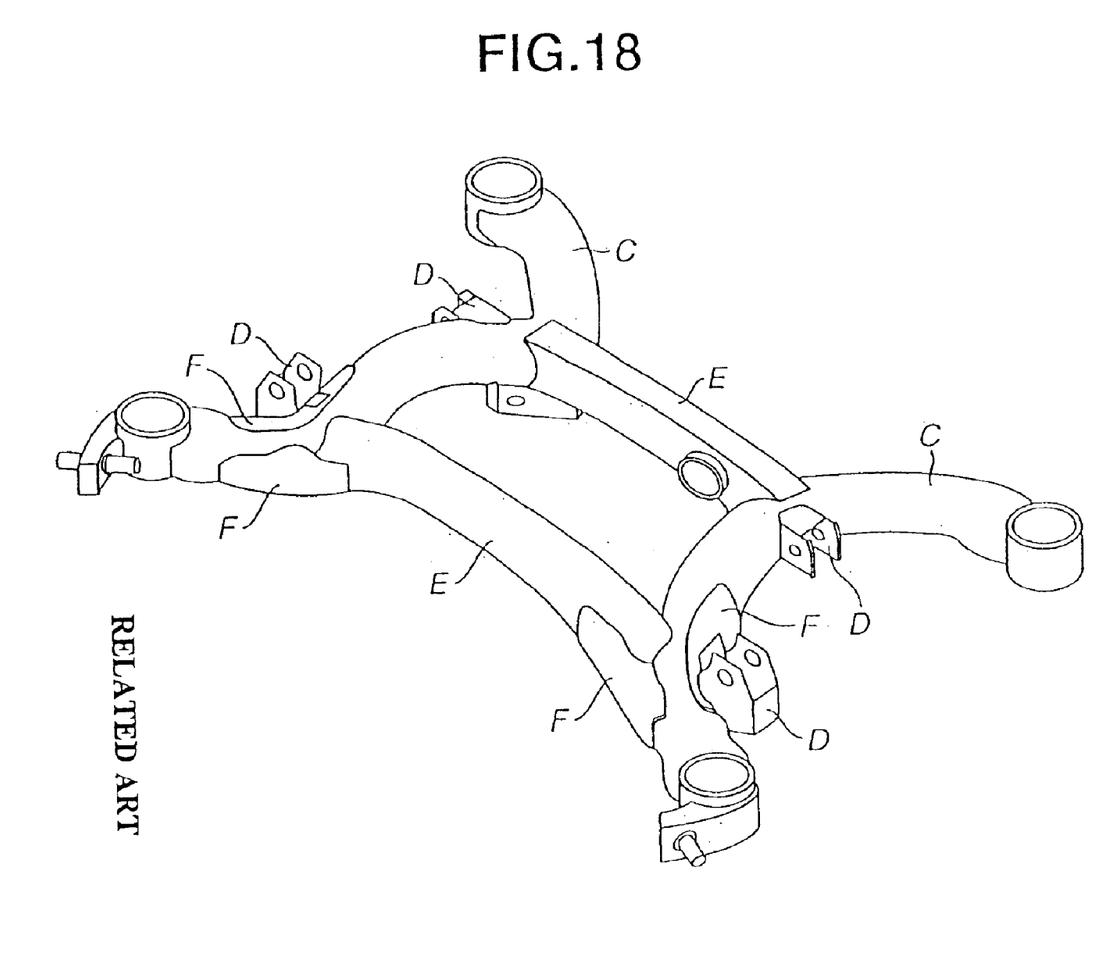
FIG. 18 is a perspective schematic view showing a vehicular member construction, according to a related art.

In view of the above Publications, hereinafter is a constitution of members for a vehicle using a tubular members made of aluminum. As is seen in FIG. 18, there are provided a pair of side members C extending in a fore-and-aft direction of the vehicle. The pair of the side members C are spaced apart from each other in a widthwise direction of the vehicle, and are connected with each other via a cross member E. Each of the side members C is fitted with a suspension link bracket D."

Figure 17:
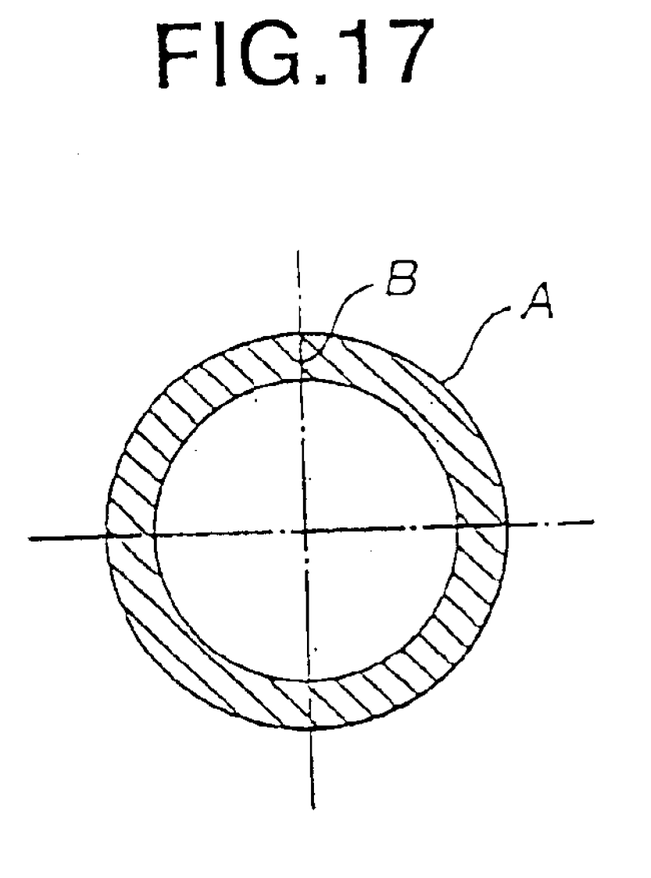
FIG. 17 is a cross section of an electric resistance weld tube.

FIG. 17 shows an electric resistance weld tube A used for the side member C in FIG. 18. The electric resistance weld tube A is rolled substantially into a coaxial tube, with its matin faces B, B welded together by a resistance heat. For increasing bending rigidity and torsional rigidity of the thus formed vehicular member, a reinforcing plate F is mounted to a connection between the side member C and the cross member E and to a portion for mounting the suspension link bracket D, as is seen in FIG. 18.

There may occur occasions requiring discontinuance of use of reinforcing plates so as to reduce the number of component parts as well as production steps. For such occasions, tubular members that constitute part of the vehicular member are to be increased in plate thickness and diameter. However, such increase may cause problems, for instance, increase in weight and cost. Moreover, the increase in diameter of the tubular member will cause interference with other component parts, to thereby restrict layout.

SUMMARY OF THE INVENTION

It is therefore an object of the present invention to provide an aluminum hollow bent member which has features such as; bend rigidity and torsional rigidity obtainable without increasing the external diameter of the aluminum hollow bent member, reduced weight and cost, and eliminating need for a reinforcing plate when the aluminum hollow bent member is used as a side member.

It is another object of the present invention to provide a vehicular member construction having features such as those described above in terms of the aluminum hollow bent member.

There is provided a metallic product. This metallic product comprises a metallic curved hollow member having a hollow cross section which comprises a thin wall portion and a thick wall portion which is thicker than the thin wall portion. The metallic curved hollow member is produced by bending a metallic straight hollow member produced by extrusion of aluminum material which is one of aluminum and aluminum alloy.

There is also provided a metallic product. This metallic product comprises a metallic curved hollow member having a hollow cross section which comprises a cross-shaped portion. The metallic curved hollow member is produced by bending a metallic straight hollow member produced by extrusion of aluminum material which is one of aluminum and aluminum alloy.

BRIEF DESCRIPTION OF THE DRAWINGS

FIG. 6 is an explanatory perspective view showing improvement in bend rigidity and torsional rigidity attributable to a partially thick wall portion 10a on the periphery of side member 10, in which, FIG. 6(a) shows thick wall portion 10a on a left side, FIG. 6(b) shows thick wall portion 10a on an upper side, FIG. 6(c) shows thick wall portion 10a on a right side, and FIG. 6(d) shows thick wall portion 10a on both the left and upper sides;

DETAILED DESCRIPTION OF THE PREFERRED EMBODIMENT

Figure 1:
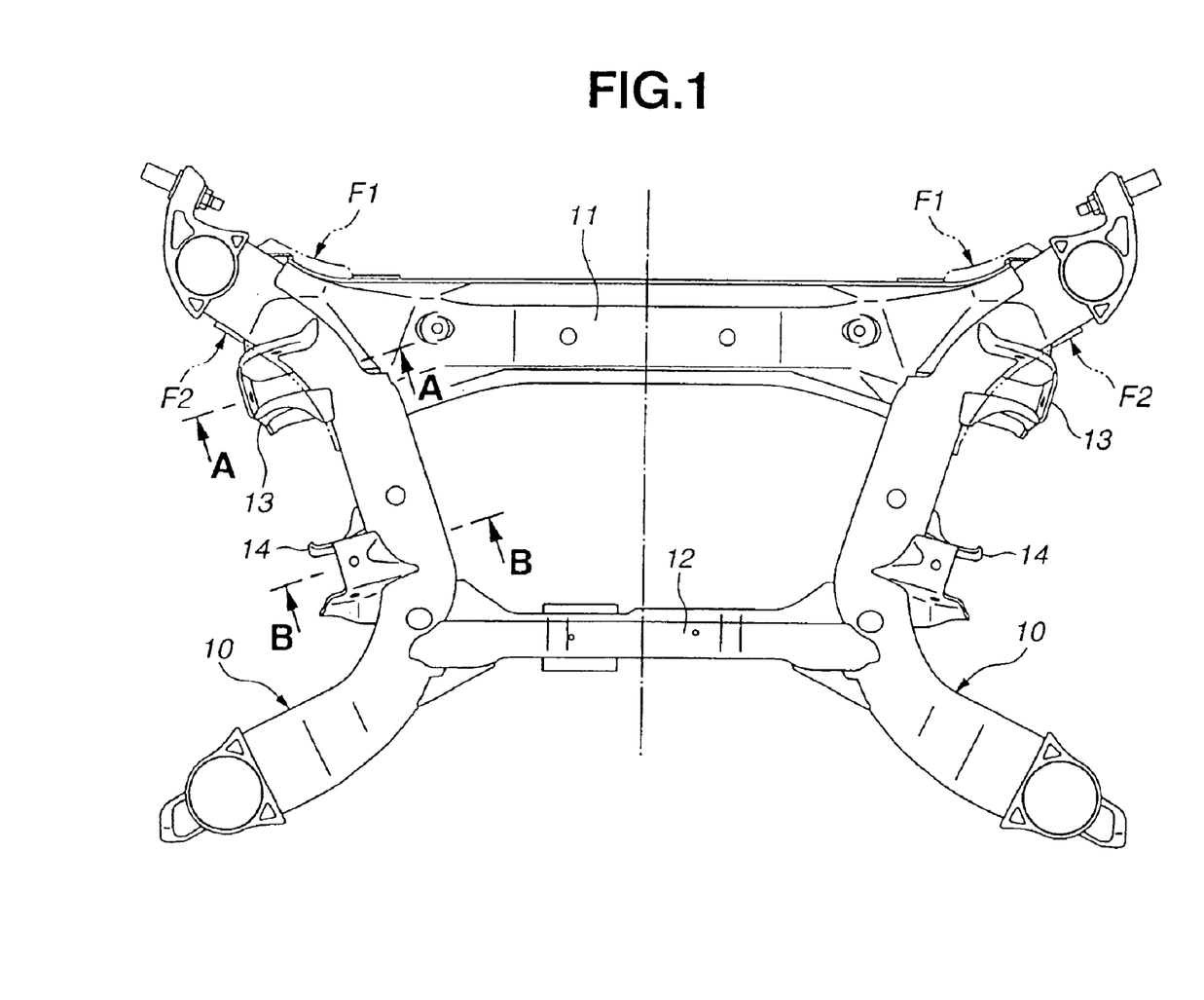
FIG. 1 is an explanatory plan view of a vehicular member construction using a side member 10, according to a first preferred embodiment of the present invention.

FIG. 1 shows a vehicular member construction having a pair of side members 10 and 10, a first cross member 11, and a second cross member 12. Each of side members 10 and 10 extends substantially in a fore-and-aft direction of a vehicle. Moreover, the pair of side members 10 and 10 are spaced apart from each other in a widthwise direction of the vehicle. First and second cross members 11 and 12 connect the pair of side members 10 and 10. First and second cross members 11 and 12 are spaced apart from each other substantially in the fore-and-aft direction of the vehicle. Each of first and second ends of first cross member 11 is coupled with one of side members 10 and 10 at a first coupling portion. On an opposite side of the first coupling portion of side member 10 (outside side member 10), there is provided a first suspension link bracket 13. Each of first and second ends of second cross member 12 is coupled with one of side members 10 and 10 at a second coupling portion. On an opposite side of the second coupling portion of the side member 10 (outside side member 10), there is provided a second suspension link bracket 14. Each of first and second suspension link brackets 13 and 14 supports a suspension link (not shown) that links side member 10 and a wheel.

There is provided the aluminum hollow bent member and the vehicular member construction, according to first, second, third and fourth preferred embodiments of the present invention. In each of the preferred embodiments, it is a side member of the vehicular member construction that is exemplified for the aluminum hollow bent member.

Figure 2:
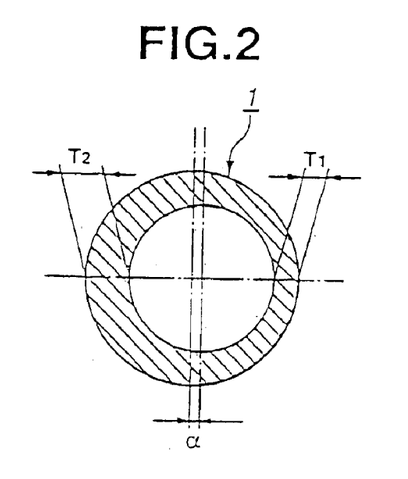
FIG. 2 is a cross section of side member 10 before a hydraulic forming, in other words, a cross section of a straight hollow member 1.

FIG. 2 is a cross section of a straight hollow member 1, namely, a vehicular side member 10 before a hydraulic forming, according to the first preferred embodiment of the present invention.

Figure 3:
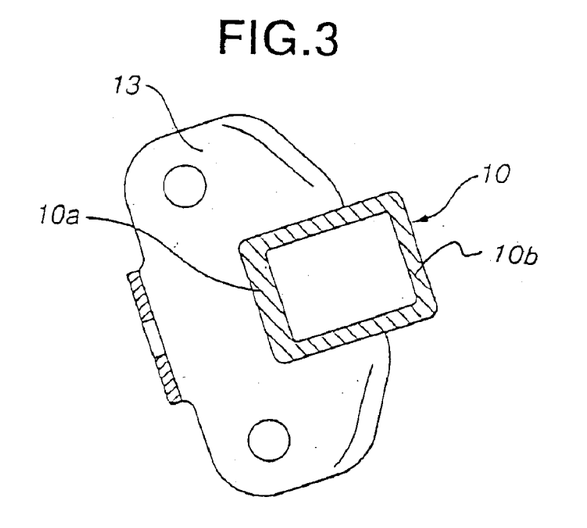
FIG. 3 is a view taken along lines A—A in FIG. 1, which is a cross section of a mounting portion for mounting a first suspension link bracket 13 to side member 10.
Figure 4:
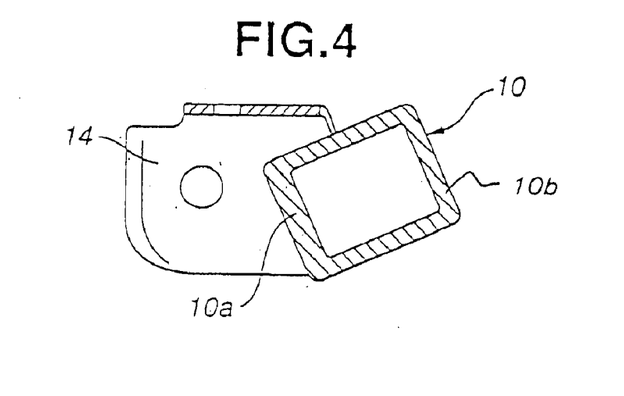
FIG. 4 is a view taken along lines B—B in FIG. 1, which is a cross section of a mounting portion for mounting a second suspension link bracket 14 to side member 10.

An extruded aluminum alloy is cut into a predetermined length, to thereby form straight hollow member 1. The thus obtained straight hollow member 1 has a circular cross section. An inner circle is deviated rightward by α in FIG. 2, to thereby form an eccentric pipe. Thus, in FIG. 2, a left thickness T2 is greater than a right thickness T1. Moreover, a section modulus is secured that is required for side member 10. Then, through the hydraulic forming (known), straight hollow member 1 (as a material) is bent, and the cross section of straight hollow member 1 is so swelled radially outwardly as to become rectangular, to thereby form side member 10 that has a partially thick wall portion 10a on its periphery. As is seen in FIG. 3, first suspension link bracket 13 is mounted to thick wall portion 10a of side member 10. Also, as is seen in FIG. 4, second suspension link bracket 14 is mounted to thick wall portion 10a. First and second suspension link brackets 13 and 14 work to increase rigidity of the overall vehicular member construction.

Thick wall portion 10a has a convex outer wall and a concave inner wall. Moreover, a thin wall portion 10b is formed in such a manner as to have a convex outer wall and a concave inner wall, as is seen in FIG. 3 and FIG. 4. Thick wall portion 10a and thin wall portion 10b are monolithic with each other, thereby preventing an inscribed mating or a circumscribed mating.

Various kinds of known hydraulic forming methods can be applied such as the one shown in a related art, Japanese Patent Unexamined Publication No. 2000-246361 (P2000-246361A). Using the related art, straight hollow member 1 having the circular cross section is so bent as to correspond to a curved configuration of side member 10. Then, the thus obtained workpiece is pressed by means of a press and the like, to thereby form a substantially rectangular cross section (preform). Then, the pressed workpiece is loaded into a cavity of upper and lower dies forming a rectangular cross section. The workpiece is then clamped by means of the upper and lower dies. Then, a liquid is injected into the pressed workpiece so as to cause a high internal pressure. With this, the pressed workpiece is swelled radially outwardly along a die surface, to thereby obtain side member 10 having a rectangular cross section.

Thus obtained side member 10 has thick wall portion 10a that is partially thick on the periphery of the side member 10. Therefore, increase can be more restricted in weight and material cost of the side member 10, as compared with increase in weight and material cost of another side member that has an equally thick wall portion on the entire periphery of the another side member.

Moreover, straight hollow member 1 before the hydraulic forming uses the extruded material that is formed with a partially thick wall portion. The thick wall portion is partially thick in the circumferential direction. Therefore, the cost of straight hollow member 1 can be more reduced, as compared with the one that is formed from the electric resistance weld tube having an equally thick wall portion on the entire periphery of the electric resistance weld tube.

Furthermore, with thick wall portion 10a disposed partially on the periphery of side member 10, a section modulus is secured that is required for side member 10 after the hydraulic forming. Therefore, side member 10 is allowed to obtain required bend rigidity and torsional rigidity, eliminating need for increasing an external diameter. Also, first and second reinforcing plates F1 and F2 (see chain lines in FIG. 1) are not needed any more. First reinforcing plate F1 was conventionally needed for reinforcing the connection for connecting first and second cross members 11 and 12 with the side member 10, while second reinforcing plate F2 was conventionally needed for reinforcing the mounting portion for mounting first and second suspension link brackets 13 and 14 to the side member 10.

Figure 5:
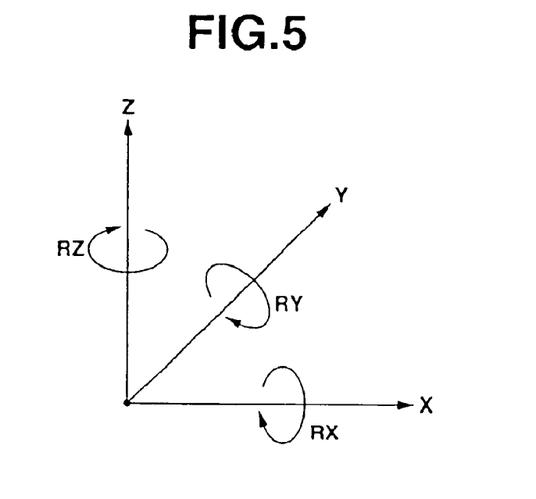
FIG. 5 is a schematic showing directions of bend and torsional forces applied to side member 10. X-axis is disposed in a long side direction of side member 10, Y-axis is disposed in a longitudinal direction of side member 10, and Z-axis is disposed in a short side direction of side member 10. RX is a torsional direction around X-axis, RY is a torsional direction around Y-axis, and RZ is a torsional direction around Z-axis.

FIG. 5 is a schematic showing directions of bend and torsional forces applied to side member 10. X-axis is disposed in a long side direction of side member 10, Y-axis is disposed in a longitudinal direction of side member 10, and Z-axis is disposed in a short side direction of side member 10. RX is a torsional direction around X-axis, RY is a torsional direction around Y-axis, and RZ is a torsional direction around Z-axis.

Figure 6:
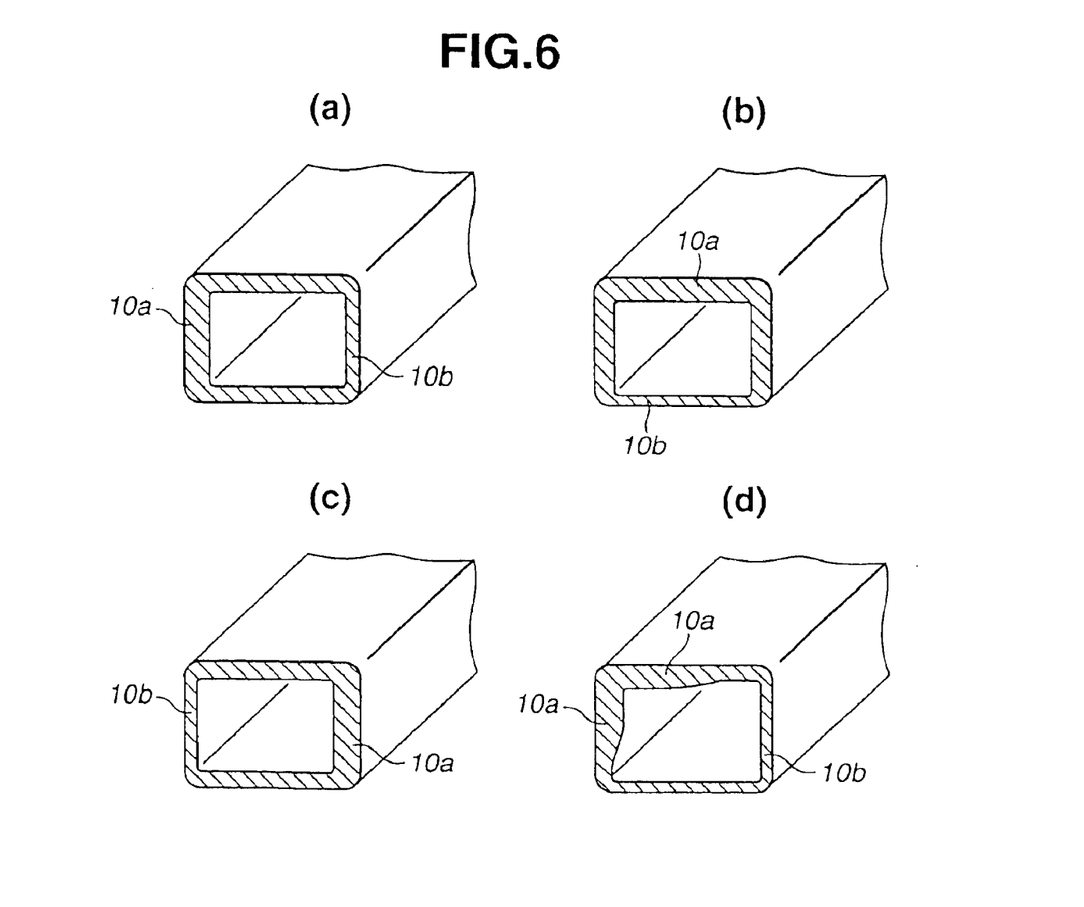

FIG. 6 is an explanatory perspective view showing improvement in bend rigidity and torsional rigidity attributable to a partially thick wall portion 10a on the periphery of side member 10, in which, FIG. 6(a) shows thick wall portion 10a on a left side, FIG. 6(b) shows thick wall portion 10a on an upper side, FIG. 6(c) shows thick wall portion 10a on a right side, and FIG. 6(d) shows thick wall portion 10a on both the left and upper sides.

Table 1 is a result of investigation in terms of bend rigidity and torsional rigidity of side member 10 according to the present invention, as compared with a side member of a related art. The side member of the related art is the one that is formed from the electric resistance weld tube. The hydraulic forming is also carried out on the electric resistance weld tube. The side member of the related art has an equally thin wall portion 10b on the entire periphery thereof.

In Table. 1, the term "Improved" means that the bend rigidity or the torsional rigidity of the present invention has been improved compared with the side member of the related art.

TABLE 1

| | | FIG. 6 | | | |
|---|---|---|---|---|---|
| | | (a) | (b) | (c) | (d) |
| Bend rigidity | X | Improved | Improved | Improved | Improved |
| | Y | — | — | — | — |
| | Z | Improved | Improved | Improved | Improved |
| Torsional rigidity | RX | Improved | Improved | Improved | Improved |
| | RY | Improved | Improved | Improved | Improved |
| | RZ | Improved | Improved | Improved | Improved |

Table 1 shows that the bend rigidity along X-axis and Z-axis, and the torsional rigidity around RX, RY and RZ have been improved as compared with the side member of the related art, irrespective of where thick wall portion 10a is formed.

Figure 7:
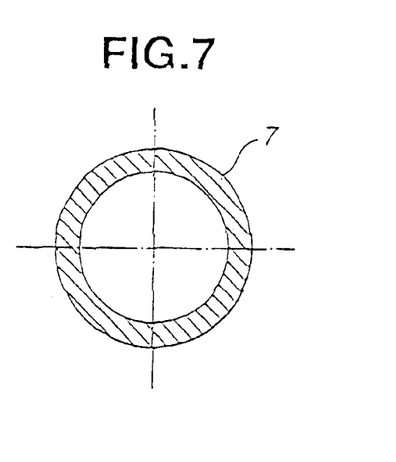
FIG. 7 is a cross section of a side member 20 before the hydraulic forming, in other words, a cross section of a straight hollow member 7, according to a second preferred embodiment of the present invention.

FIG. 7 is a cross section of a straight hollow member 7 of a vehicular side member 20 before the hydraulic forming, according to the second preferred embodiment of the present invention.

An extruded aluminum alloy is cut into a predetermined length, to thereby form straight hollow member 7. Thus obtained straight hollow member 7 is a pipe which has a cross section formed with concentric inner and outer circles, with an equal wall thickness around the entire circumference of the straight hollow member 7. Moreover, a section modulus is secured that is required for side member 20 after the hydraulic forming.

Then, straight hollow member 7 (as a material) is bent through the hydraulic forming (known). The cross section of straight hollow member 7 is so swelled radially outwardly as to become rectangular in shape.

Figure 10:
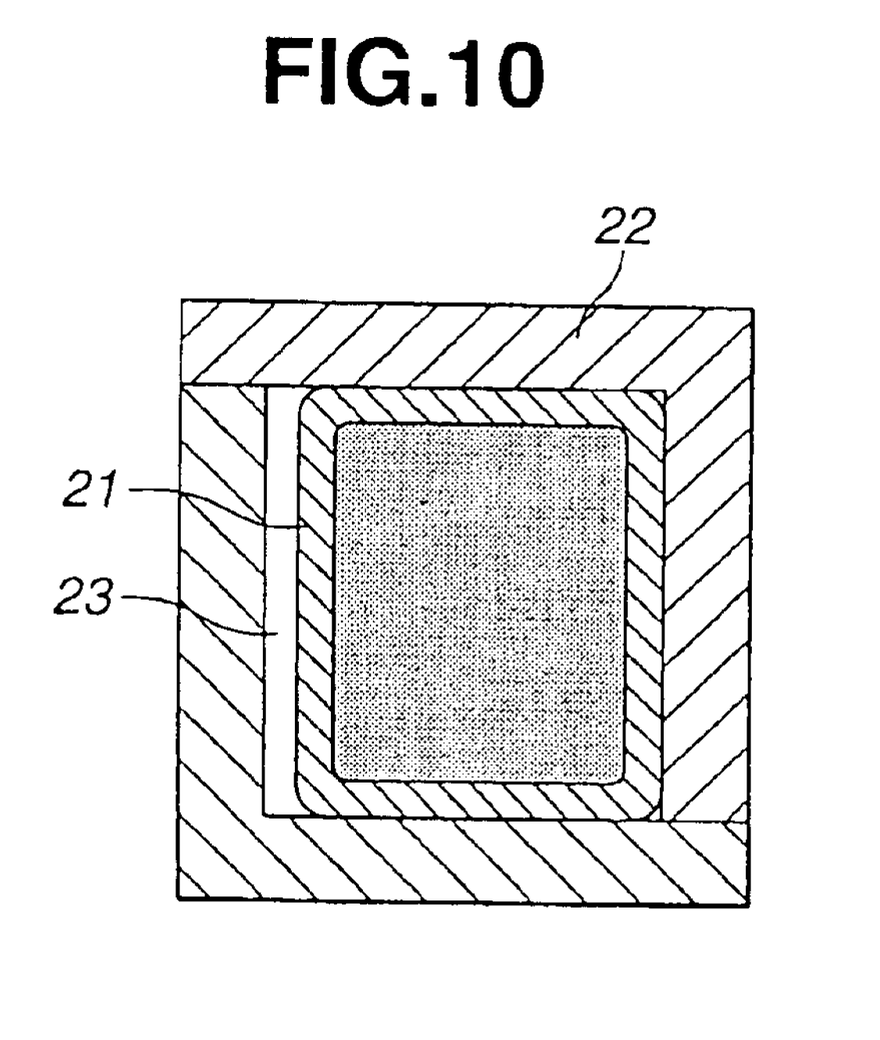
FIG. 10 is a schematic cross section for explaining the hydraulic forming method.

According to the second preferred embodiment, like the first preferred embodiment, the hydraulic forming has the following steps: Straight hollow member 7 having the circular cross section is so bent as to correspond to a curved configuration of the side member 20. Then, the thus bent workpiece is pressed by means of the press and the like, to thereby form a substantially rectangular cross section (preform). Then, the pressed workpiece is loaded into a cavity of upper and lower dies forming a rectangular cross section. Then, the workpiece is to be clamped by means of the upper and lower dies. It is necessary to provide a difference in plate thickness of side member 20. Therefore, as is seen in FIG. 10, when a pressed workpiece 21 is loaded into the cavity of upper and lower dies 22, there is defined a gap 23 between die 22 and workpiece 21. The gap 23 is comparatively large so as to be provided for a thick plate. Then, a liquid is injected into pressed workpiece 21 so as to cause a high internal pressure. Then, pressed workpiece 21 on a side of gap 23 becomes greatly swollen so as to form a thick wall portion. A portion other than a thin wall portion is formed with a partially thick wall portion 20a, to thereby form side member 20.

Figure 8:
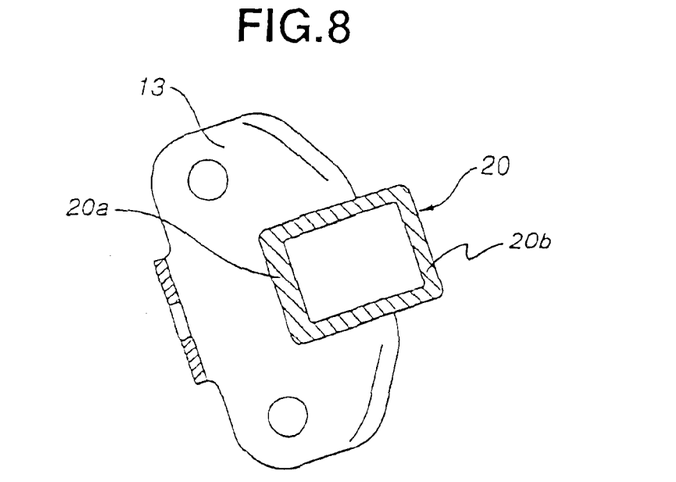
FIG. 8 is a cross section of a mounting portion for mounting a first suspension link bracket 13 to side member 20.
Figure 9:
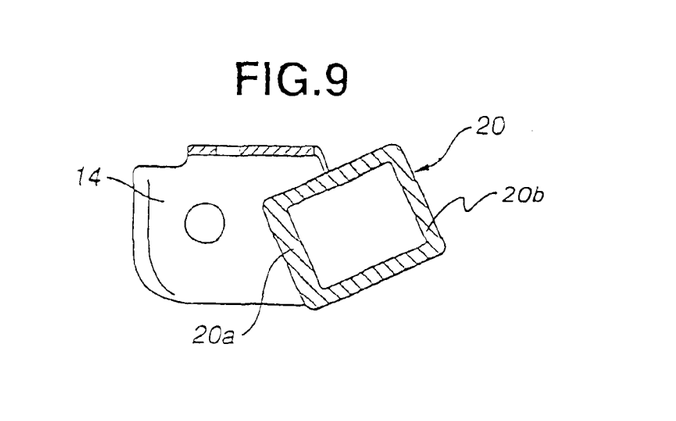
FIG. 9 is a cross section of a mounting portion for mounting a second suspension link bracket 14 to side member 20.

First and second suspension link brackets 13 and 14 are then mounted on the obtained side member 20, as is seen, respectively, in FIG. 8 and FIG. 9. Thereby, rigidity of the entire vehicular member construction is improved.

Operation and effect according to the second preferred embodiment are omitted since they are substantially the same as those according to the first preferred embodiment.

More specifically, as is seen in FIG. 8, first suspension link bracket 13 is mounted to thick wall portion 20a of side member 20. Also, as is seen in FIG. 9, second suspension link bracket 14 is mounted to thick wall portion 20a. Thick wall portion 20a has a convex outer wall and a concave inner wall. Moreover, a thin wall portion 20b is formed in such a manner as to have a convex outer wall and a concave inner wall, as is seen in FIG. 8 and FIG. 9. Thick wall portion 20a and thin wall portion 20b are monolithic with each other, thereby preventing the inscribed mating or the circumscribed mating.

Figure 11:
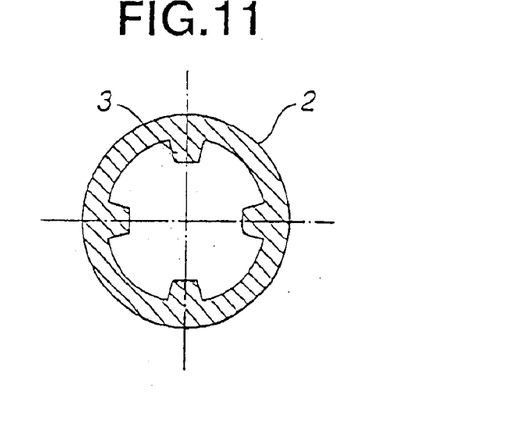
FIG. 11 is a cross section of a side member 30 before the hydraulic forming, in other words, a cross section of a straight hollow member 2, according to a third preferred embodiment of the present invention.

FIG. 11 is a cross section of a straight hollow member 2 of a vehicular side member 30 before the hydraulic forming, according to the third preferred embodiment of the present invention.

Figure 12:
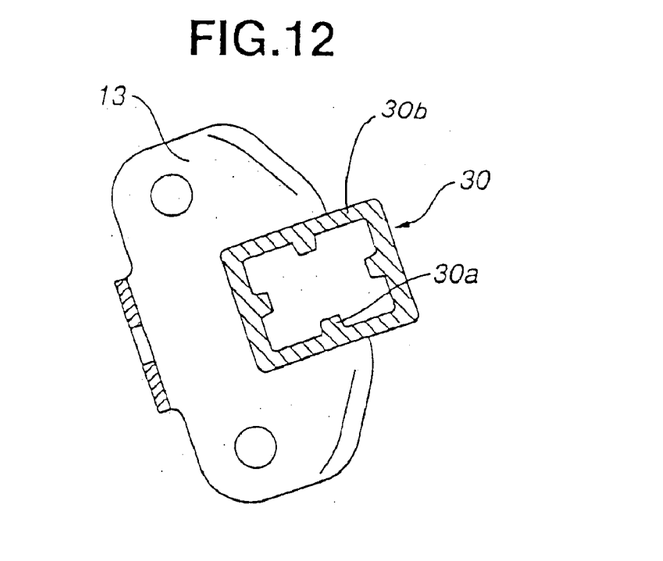
FIG. 12 is a cross section of a mounting portion for mounting a first suspension link bracket 13 to side member 30.
Figure 13:
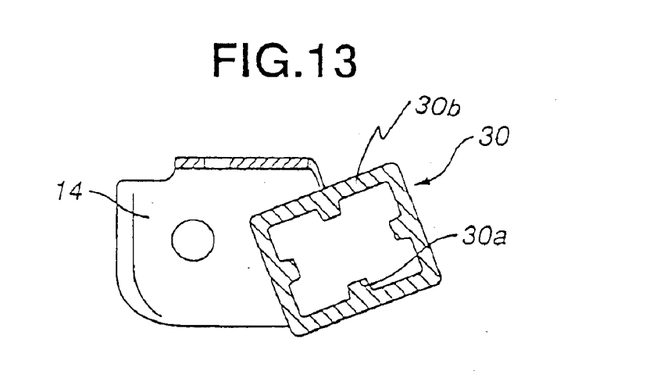
FIG. 13 is a cross section of a mounting portion for mounting a second suspension link bracket 14 to side member 30.

An extruded aluminum alloy is cut into a predetermined length, to thereby form straight hollow member 2. Thus obtained straight hollow member 2 has four projections 3. Each of four projections 3 extends along an axial direction of a pipe which has a cross section formed with concentric inner and outer circles. Four projections 3 are disposed circumferentially at regular angular intervals of ninety degrees. Thereby, straight hollow member 2 has partially thick wall portions in the circumferential direction. Moreover, a section modulus is secured that is required for side member 30 after the hydraulic forming. Then, straight hollow member 2 (as a material) is bent through the hydraulic forming in a manner same as the one according to the first preferred embodiment. Then, the cross section of straight hollow member 2 is so swelled radially outwardly as to become rectangular, to thereby form side member 30 having a substantially rectangular cross section. Side member 30 is partially formed with four thick wall portions 30a disposed at substantially equal intervals along the rectangle. As is seen in FIG. 12, first suspension link bracket 13 is mounted to thick wall portion 30a of side member 30. Also, as is seen in FIG. 13, second suspension link bracket 14 is mounted to thick wall portion 30a.

Thick wall portion 30a has a convex outer wall and a convex inner wall. Moreover, a thin wall portion 30b is formed in such a manner as to have a convex outer wall and a concave inner wall, as is seen in FIG. 12 and FIG. 13. Thick wall portion 30a and thin wall portion 30b are monolithic with each other thereby preventing the inscribed mating or the circumscribed mating.

Side member 30 having the thus obtained construction is partially formed with four thick wall portions 30a at substantially equal intervals. Thereby, rigidity of the entire vehicular member construction is improved.

Operation and effect according to the third preferred embodiment are omitted since they are substantially the same as those according to the first preferred embodiment.

Figure 14:
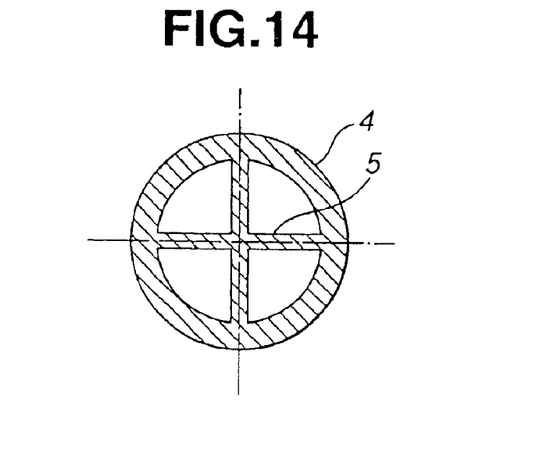
FIG. 14 is a cross section of side member 40 before the hydraulic forming, in other words, a cross section of a straight hollow member 4, according to a fourth preferred embodiment of the present invention.

FIG. 14 is a cross section of a straight hollow member 4 of a vehicular side member 40 before the hydraulic forming, according to the fourth preferred embodiment of the present invention.

An extruded aluminum alloy is cut into a predetermined length, to thereby form straight hollow member 4. Thus obtained straight hollow member 4 has a cross section formed with concentric inner and outer circles. On the inner circle (or actually an inner cylinder of straight hollow member 4), there is provided an intersecting portion 5 which is pictographically shaped into the plus sign "+" and is so disposed as to close the cross section of straight hollow member 4. In other words, straight hollow member 4 has a cavity which extends in a longitudinal direction of straight hollow member 4 and is separated into four sub-cavities by intersecting portion 5. Moreover, a section modulus is secured that is required for side member 40 after the hydraulic forming.

Figure 15:
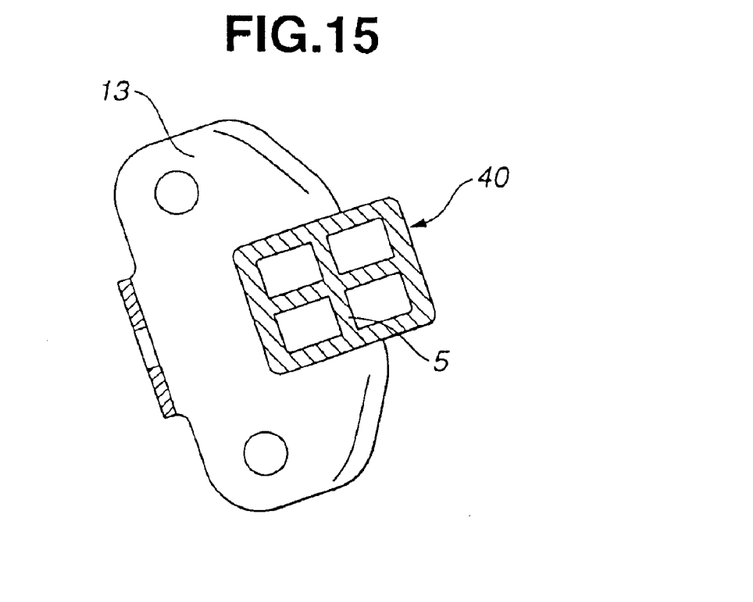
FIG. 15 is a cross section of a mounting portion for mounting a first suspension link bracket 13 to side member 40.
Figure 16:
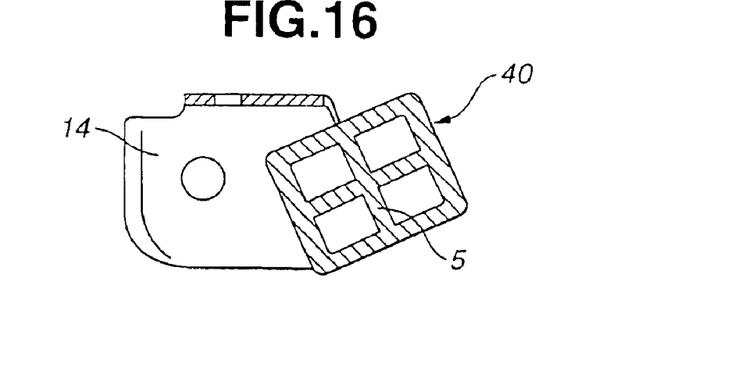
FIG. 16 is a cross section of a mounting portion for mounting a second suspension link bracket 14 to side member 40.

Then, straight hollow member 4 (as a material) is bent through the hydraulic forming in the manner same as the one according to the first preferred embodiment. Then, the cross section of straight hollow member 4 is so swelled radially outwardly as to become rectangular, to thereby form side member 40 that is formed with intersecting portion 5. As is seen in FIG. 15, first suspension link bracket 13 is mounted to side member 40 including intersecting portion 5. Also, as is seen in FIG. 16, second suspension link bracket 14 is mounted to side member 40 including intersecting portion 5. Thereby, rigidity of the entire vehicular member construction is improved.

As is seen in FIG. 14, straight hollow member 4 is entirely thicker than intersecting portion 5. Likewise, as is seen in FIG. 15 and FIG. 16, side member 40 is partly thicker than intersecting portion 5.

Other operation and effect according to the fourth preferred embodiment are omitted since they are substantially the same as those according to the third preferred embodiment.

The entire contents of Japanese Patent Application No. 2000-112573 (filed Apr. 13, 2000) is incorporated herein by reference.

Although the invention has been described above by reference to certain embodiments of the invention, the invention is not limited to the embodiments described above. Modifications and variations of the embodiments described above will occur to those skilled in the art, in light of the above teachings.

For example, it is the straight hollow member having the circular external cross section that has been used according to each of the embodiments described above. However, the present invention is not limited to the circular external cross section. For example, a straight hollow member having a rectangular external cross section can be used under the present invention.

Moreover for example, it is the hydraulic forming method that is used for obtaining the side member from the straight hollow member, according to each of the embodiments described above. However, the present invention is not limited to the hydraulic forming method that brings about an excellent shape stability of workpieces. For example, a press can be used for bending the straight hollow member so as to obtain the side member, provided that the straight hollow member is partially thickened circumferentially and has a cross section rectangular in shape.

Furthermore for example, it is the side member that is embodied according to each of the embodiments described above. However, the present invention is not limited to the side member. The present invention is also applicable to the cross member.

The scope of the invention is defined with reference to the following claims.

What is claimed is:

1. A vehicular member construction comprising:
a pair of side members extending substantially in a fore-and-aft direction of a vehicle and spaced apart from each other substantially in a widthwise direction of the vehicle; and
a pair of cross members including a first cross member and a second cross member spaced apart from each other in the fore-and-aft direction of the vehicle connecting the pair of the side members;
wherein at least one of the pair of the side members and the pair of the cross members has a hollow cross section comprising:
a thin wall;
a thick wall which is thicker than the thin wall; and
connecting walls between the thin wall and the thick wall;
wherein the thin wall, the thick wall, and the connecting walls are monolithic with each other, and
wherein the thin wall, the thick wall and the connecting walls are free from an inscribed mating with each other,
wherein at least one of the pair of side members comprises a hollow cross section comprising a thin wall and a thick wall which is thicker than the thin wall, and a suspension link bracket for supporting a suspension link for linking the at least one of the pair of side members and a wheel of the vehicle, the suspension link bracket being mounted on the thick wall of the at least one of the pair of side members in such a manner that the thin wall is free from mounting with the suspension link bracket.

2. The vehicular member construction as claimed in claim 1, in which the at least one of the pair of side members and the pair of cross members that have the hollow cross section comprising the thick wall comprises a bent metallic hollow extruded aluminum material member, the aluminum material being one of aluminum and aluminum alloy.

3. The vehicular member construction as claimed in claim 2, in which the thick wall and the thin wall extend in a longitudinal direction of the at least one of the pair of side members, and in which the thick wall and the thin wall are extruded sections.

4. The vehicular member construction as claimed in claim 3, in which the metallic hollow member has a hollow cross section which comprises a thin wall portion and a thick wall portion which is thicker than the thin wall portion.

5. The vehicular member construction as claimed in claim 4, in which the metallic hollow member is formed from an eccentric pipe comprising an inner cylindrical surface and an outer cylindrical surface, a center of the inner cylindrical surface being eccentric from a center of the outer cylindrical surface.

6. The vehicular member construction as claimed in claim 1, in which at least one of said thick walls is formed through a hydraulic forming method comprising the following sequential operations of: bending a workpiece which is straight and hollow; and pressing the workpiece so that the workpiece has a cross section which is substantially rectangular in shape.

7. The vehicular member construction as claimed in claim 6, in which upper and lower dies used for the hydraulic forming method defines a cavity which is formed with an inner surface, and in which a gap defined between the workpiece and a first portion of the inner surface of the cavity is greater than a gap defined between the workpiece and a second portion of the inner surface, the workpiece being at least one of the pair of side members or the pair of cross members.

8. The vehicular member construction as claimed in claim 1, wherein the at least one of the pair of the side members and the pair of the cross members having the thin wall, the thick wall, and the connecting walls also has a plurality of portions having a convex outer wall and a concave inner wall.

9. The vehicular member construction as claimed in claim 1, wherein at least one of said thin walls is monolithic with a portion having a convex outer wall and a concave inner wall, and wherein at least one of said thick walls has a convex inner wall.

10. The vehicular member construction as claimed in claim 1, wherein the at least one of the pair of side members and the pair of the cross members has a cross section consisting of four walls and curved portions connecting the four walls.

* * * * *